United States Patent
Yamamoto et al.

(10) Patent No.: US 7,492,697 B2
(45) Date of Patent: Feb. 17, 2009

(54) OPTICAL DISC RECORDING METHOD AND APPARATUS

(75) Inventors: Tsuyoshi Yamamoto, Osaka (JP); Katsuki Hattori, Osaka (JP); Masato Fuma, Osaka (JP); Yutaka Yamanaka, Tokyo (JP); Tatsunori Ide, Tokyo (JP); Shigeru Shimonou, Tokyo (JP); Yutaka Kashihara, Kanagawa (JP); Akihito Ogawa, Kanagawa (JP); Hideki Takahashi, Chiba (JP)

(73) Assignees: Sanyo Electric Co., Ltd., Osaka (JP); NEC Corporation, Tokyo (JP)

( * ) Notice: Subject to any disclaimer, the term of this patent is extended or adjusted under 35 U.S.C. 154(b) by 626 days.

(21) Appl. No.: 11/141,833

(22) Filed: Jun. 1, 2005

(65) Prior Publication Data
US 2005/0270966 A1 Dec. 8, 2005

(30) Foreign Application Priority Data
Jun. 2, 2004 (JP) ............................ 2004-164625

(51) Int. Cl.
G11B 7/00 (2006.01)
(52) U.S. Cl. .................. 369/275.3; 369/53.2; 369/275.4
(58) Field of Classification Search ............... 369/275.3
See application file for complete search history.

(56) References Cited

U.S. PATENT DOCUMENTS 5,031,168 A * 7/1991 Moore .................... 369/59.25
5,276,674 A * 1/1994 Tanaka .................... 369/53.15
5,559,777 A * 9/1996 Maeda et al. ............. 369/47.5
6,104,691 A   8/2000 Yamamoto et al.
7,200,102 B2 * 4/2007 Irie et al. ................. 369/275.3
2003/0086307 A1   5/2003 Lee et al.
2005/0163030 A1* 7/2005 Irie et al. ................. 369/275.3

FOREIGN PATENT DOCUMENTS

EP           1280141 A2     1/2003

(Continued)

OTHER PUBLICATIONS

KR20020074996 Kim Jin Yong Oct. 4, 2002 English Translation Compatible high density optical disc and optical device.*
European Office Action, (Communication Pursuant to Article 96(2) EPC)(Apr. 25, 2007).

(Continued)

*Primary Examiner*—Tan X Dinh
*Assistant Examiner*—Van N Chow
(74) *Attorney, Agent, or Firm*—Pillsbury Winthrop Shaw Pittman LLP

(57) ABSTRACT

Data is recorded on an optical disc using a combination of a user data area where user data is recorded, a control data area for reproduction provided on an inner radius side of the user data area, and an outer guard zone provided on an outer radius side of the user data area as a unit of one recording operation. In this configuration, a track pitch TP of the optical disc is greater than or equal to 0.3 μm and smaller than or equal to 0.4 μm, and the width of the outer guard zone along a radius direction of the optical disc is greater than or equal to a value of (100×TP) and smaller than or equal to a value of (125×TP).

14 Claims, 6 Drawing Sheets

FOREIGN PATENT DOCUMENTS

| | | |
|---|---|---|
| JP | 10142494 | 5/1998 |
| JP | 2001266495 | 9/2001 |
| JP | 2002140858 | 5/2002 |
| JP | 2002260341 | 9/2002 |
| KR | 2002-0074996 | 10/2002 |
| WO | WO 03/094156 A1 | 11/2003 |

OTHER PUBLICATIONS

Office Action, "Notice of Grounds for Rejection" dated May 13, 2008, Patent Application Serial No. 2004-164625, pp. 1-2.

Office Action, "Notice of Grounds for Rejection," Korean Intellectual Property Office, p. 1-3, (Sep. 30, 2006).

"European Search Report," European Patent Office (The Hague), (Oct. 20, 2006).

* cited by examiner

US 7,492,697 B2

OPTICAL DISC RECORDING METHOD AND APPARATUS

CROSS-REFERENCE TO RELATED APPLICATION

The entire disclosure of Japanese Patent Application No. 2004-164625 including the specification, claims, drawings and abstract is incorporated herein by reference.

BACKGROUND OF THE INVENTION

1. Field of the Invention

The present invention relates to an optical disc recording method and an optical disc recording apparatus in which data is recorded on a recordable optical disc.

2. Description of the Related Art

Recordable optical discs, such as a CD-R, a CD+R, a DVD-R, a DVD+R, a DVD-RAM, a DVD-RW, a DVD+RW, or the like have been put to wide use in recent years. These optical discs have a guide slot known as a groove which is previously formed thereon to enable accurate tracking even in unrecorded conditions. In addition, address information is previously embedded using groove wobbling, land pre-pit, or the like to thereby enable data writing at a desired position.

Because a play-only apparatus is generally capable of tracing only a pit train, the tracing of tracks is not performed in an unrecorded region including no pit train. Further, it is also impossible to recognize the address information embedded by groove wobbling or the like, which results in inability to identify an address in the unrecorded region. Therefore, to enable reproduction by the play-only apparatus, i.e. to ensure playability of such a play-only apparatus, an optical disc needs a recorded region having a certain width.

In view of the playability, an attempt has been made up to this time where a region having at least a predetermined width is rendered as a recorded region regardless of the amount of data in each recording operation. For example, when the amount of data to be recorded is insufficient for filling the region of the predetermined width, padding data is used to fill the region.

Further, a guard zone is provided to an outer radius side of a user data area where user date is recorded, to protect an optical pickup from overrunning. On the other hand, an inner radius side of the user data area is allocated to a control data area for reproduction where information necessary for reproduction of the user data area is recorded.

FIG. 7 shows a data layout in a DVD-R. As shown in FIG. 7, a control data area A0' to be used during data recording is formed on the innermost circumference. An outer radius side of the control data area A0' is allocated to an inner guard zone A1' to prevent overrun or the like. Each unit of one recording operation including a control data area for reproduction A2' and an outer guard zone A4' with a user data area A3' sandwiched therebetween is sequentially recorded on an outer radius side of the inner guard zone A1'. In the direction of the radius of an optical disc, the width of the control data area for reproduction A2' is approximately 240µm (equivalent to approximately 324 tracks), the width of the outer guard zone A4' is approximately 500 µm (equivalent to approximately 676 tracks), and the width of the user data area A3' is greater than or equal to approximately 1650 µm (equivalent to approximately 2230 tracks, which is the minimum recording width).

The format of such an optical disc is standardized. A data layout for a CD-R is described in Japanese Patent Laid-Open Publication No. 2001-266495.

The above-described control data area for reproduction and the outer guard zone or the padding data for filling the minimum recording width consume a recordable region of an optical disc in addition to causing an increase in length of data writing time. More specifically, even when an amount of user data equivalent to one track data is recorded, approximately 3230 tracks are used in a DVD-R while taking the length of time required for writing approximately 3230 tracks of data.

SUMMARY OF THE INVENTION

The present invention provides an optical disc recording method in which data is recorded on an optical disc using a combination of a user data area where user data is recorded, a control data area for reproduction allocated on an inner radius side of the user data area, and an outer guard zone allocated on an outer radius side of the user data area as a unit of one recording operation. In the optical disc recording method, a track pitch TP of the optical disc is greater than or equal to 0.3 µm and smaller than or equal to 0.4 µm, and the width of the outer guard zone along a radius direction of the optical disc is greater than or equal to a value of (100×TP) and smaller than or equal to a value of (125×TP).

Further, the present invention provides an optical disc recording apparatus in which data is recorded on an optical disc using a combination of a user data area where user data is recorded, a control data area for reproduction allocated on an inner radius side of the user data area, and an outer guard zone allocated on an outer radius side of the user data area as a unit of one recording operation. In the optical disc recording apparatus, a track pitch TP of the optical disc is greater than or equal to 0.3 µm and smaller than or equal to 0.4 µm, and the width of the outer guard zone along a radius direction of the optical disc is greater than or equal to a value of (100×TP) and smaller than or equal to a value of (125×TP).

BRIEF DESCRIPTION OF THE DRAWINGS

A preferred embodiment of the present invention will be described in further detail based on the following drawings, wherein.

DESCRIPTION OF THE PREFERRED EMBODIMENTS

Figure 1:
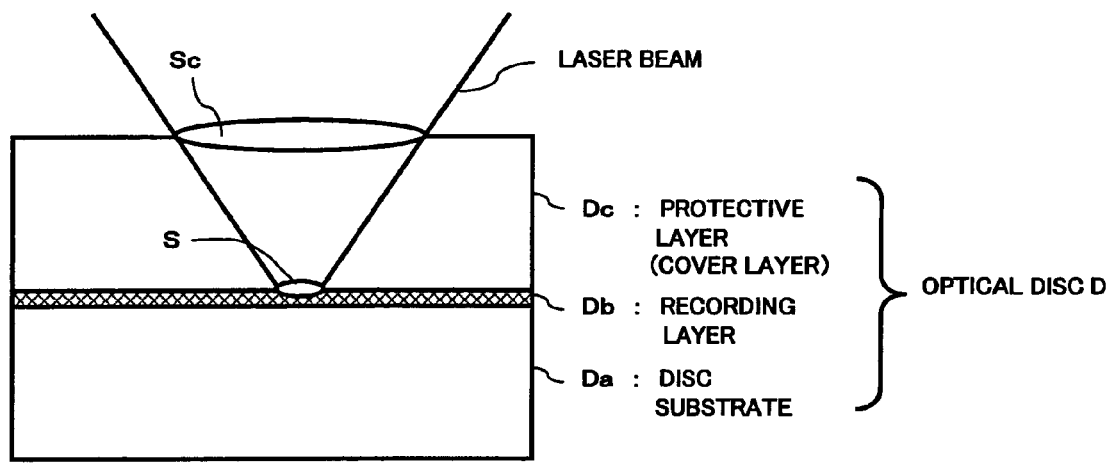
FIG. 1 is a sectional view showing a layer structure of an optical disc according to an embodiment of the present invention.
Figure 2:
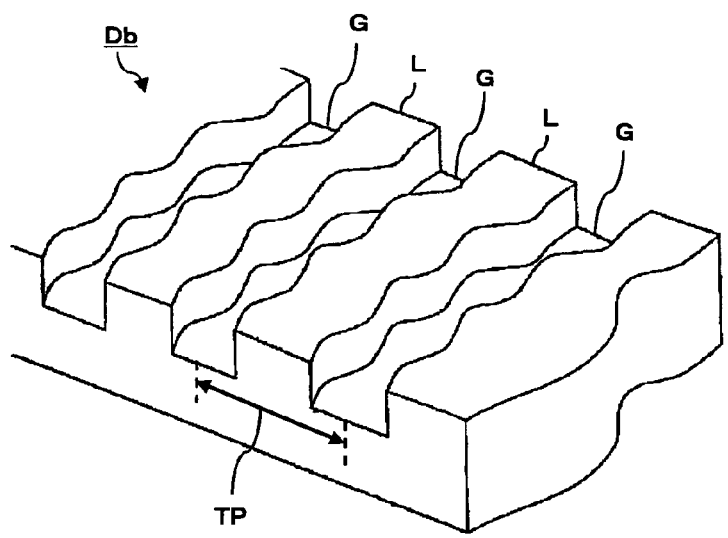
FIG. 2 is a perspective view showing an enlarged surface of a recording layer of the optical disc according to the embodiment.
Figure 3:
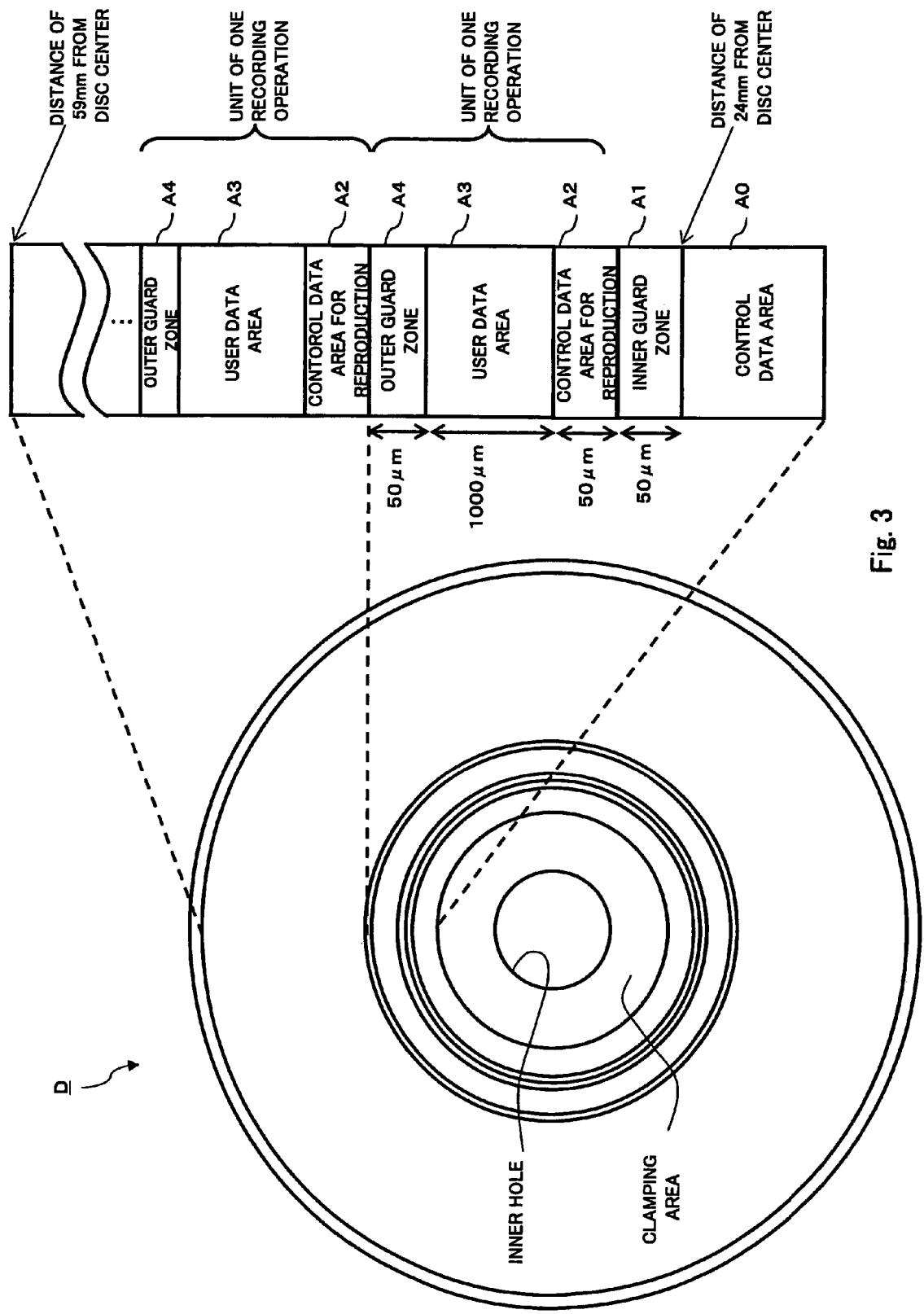
FIG. 3 shows a data layout of an optical disc according to the embodiment.
Figure 4:
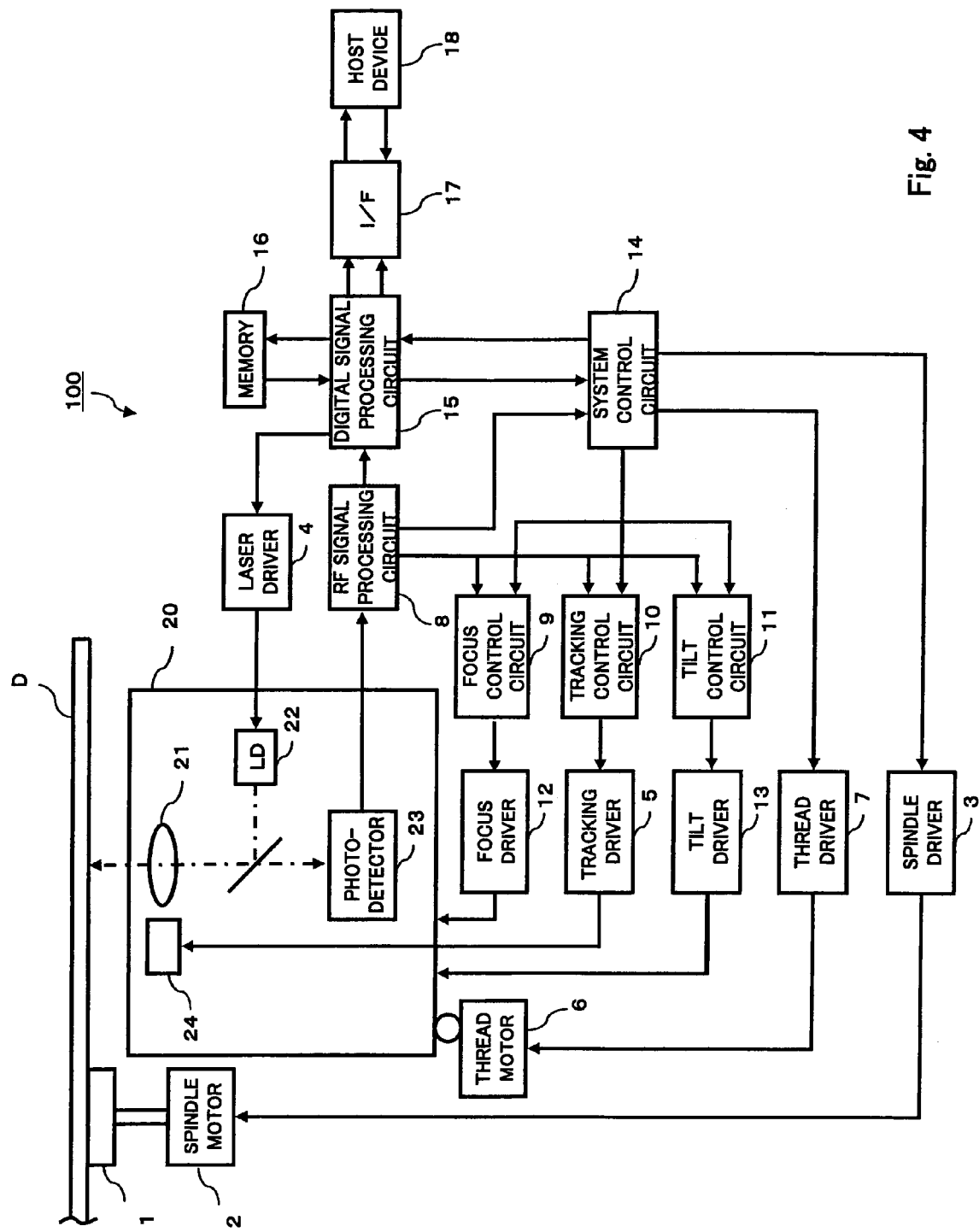
FIG. 4 is a block diagram depicting a structure of an optical disc recording and reproducing apparatus according to the embodiment.

A preferred embodiment of the present invention will be described in accordance with the drawings. FIG. 1 is a sectional view showing a layer structure of an optical disc D according to the present embodiment. FIG. 2 is a perspective view showing an enlarged surface of a recording layer Db of the optical disc D according to the embodiment. FIG. 3 shows a data layout of the optical disc D according to the embodiment. FIG. 4 is a block diagram depicting a structure of an optical disc recording and reproducing apparatus 100 according to the embodiment.

The optical disc recording and reproducing apparatus 100 performs recording and reproducing operations not in the format standardized for DVD-Rs or the like but in a new format defined below. In terms of basic structure, however, the optical disc D and the optical disc recording and reproducing apparatus 100 have a lot of commonalities with conventional discs, such as a DVD-R, or the like, and conventional optical disc recording and reproducing apparatuses. Then, following a brief description about basic structures of the optical disc D and the optical disc recording and reproducing apparatus 100, specific features of this embodiment will be described.

The optical disc D according to this embodiment is described with reference to FIGS. 1 and 2. The optical disc D comprises, as shown in FIG. 1, a recording layer Db and a protective layer (also referred to as a cover layer) Dc laminated on a disc substrate Da having the geometry of a circular plate (which is 120 mm in diameter and 1.2 mm in thickness in this embodiment). The optical disc D is preferably of a write-once read-multiple type, but may be of a rewritable type.

As shown in FIG. 2, the recording layer Db of the optical disc D has grooves G being guide slots formed in a concentric or spiral fashion along a direction of the circumference of the optical disc D and lands L formed between the grooves G. In this embodiment, data is recorded on the grooves G. It should be noted that data can be recorded on both the grooves G and the lands L. The grooves G wobble as shown in FIG. 2, and by means of such wobbling, data writing on an unrecorded region of the optical disc D is enabled. More specifically, data such as address information, rotational speed information, or the like can be retrieved using a wobble signal obtained by the wobbling. The address information may be embedded in another form such as a land pre-pit (LPP) or the like.

Spacing between recording tracks along a radius direction of the optical disc D is referred to as a track pitch. As shown in FIG. 2, spacing between adjacent groove tracks is a track pitch TP in this embodiment.

Next, a data layout of the optical disc D in this embodiment will be described with reference to FIG. 3. On the innermost circumference of the optical disc D, in FIG. 3, there is allocated a control data area A0 which is used during a recording operation. More specifically, user data control information which is used during a recording operation is recorded on the control data area A0. A further inner radius side of the control data area A0 may be allocated to a test area where trial writing is performed.

The outer radius side of the control data area A0 is a recordable area where one or more user data areas A3 are sequentially formed. The user data areas A3 store user data written therein. On the inner radius side of each of the user data areas A3, a control data area for reproduction A2 is formed, while an outer guard zone A4 is formed on the outer radius side of each of the user data areas A3. A combination of the control data area for reproduction A2, the user data area A3, and the outer guard zone A4 is regarded as a unit of one recording operation. On an inner radius side of the unit of one recording operation recorded on the innermost track, i.e. on the inner radius side of the innermost control data area for reproduction A2, an inner guard zone A1 is formed.

On the control data area for reproduction A2, there is recorded user data control information used while reproducing corresponding user data area A3. The inner and outer guard zones A1 and A4 are guard bands including padding data or the like. These guard zones A1 and A4 are buffering regions to protect an optical pickup from overrunning as well as being regions which work to facilitate smooth reading at a leading edge of the control data area for reproduction A2 formed immediately outside the guard zone A1 or A4.

Data is recorded on the optical disc D sequentially in the user data area A3, the control data area for reproduction A2, the control data area A0, and the outer guard zone A4 in that order, for example. The process of disabling writing to the optical disc D is performed, for example, such that write disable information is entered in the outer guard zone A4 when writing is disabled as well as recording of user data, whereas an outer guard zone A4 including write disable information is formed on the outermost circumference when writing is disabled independently of the recording of user data.

With reference to FIG. 4, a structure of the optical disc recording and reproducing apparatus 100 according to this embodiment will be described below. In FIG. 4, the optical disc D is placed on a turntable 1 which is driven for rotation by a spindle motor 2. The spindle motor 2 is driven by a spindle driver 3.

An optical pickup 20 is placed below the under surface of the optical disc D. Data writing and data reading to/from the optical disc D is performed by applying a laser beam from the optical pickup 20 to the optical disc D. More specifically, by irradiating a recording layer Db with a recording laser beam modulated in accordance with data to be recorded (hereinafter referred to as "recording data"), a pit train corresponding to the recording data is formed on the recording layer Db. Then, when the pit train is irradiated with a reproducing laser beam, changes in reflectance of the laser beam is detected, to thereby read data having been written on the optical disc D.

The optical pickup 20 has an object lens 21, a laser diode 22 which emits a laser beam applied through the object lens 21 to the optical disc D, and a photodetector 23 which receives light reflected from the optical disc D, embedded therein. The laser diode 22 is driven by a laser driver 4. A beam spot S is formed on the recording layer Db of the optical disc D by irradiation with the laser beam from the optical pickup 20.

The object lens 21 can be moved along a radius direction of the optical disc D by a tracking actuator 24 driven by a tracking driver 5. The tracking actuator 24 moves the object lens 21 specifically when relatively small movement of the beam spot S on a disc surface, such as relatively small jump (a fine seek), relatively small tracking, or the like is needed. A moving range of the object lens 21 operated by the tracking actuator 24 is, for example, approximately ±200 μm.

The entire optical pickup unit 20 is movable along the radius direction of the optical disc D by means of a thread motor 6 driven by a thread driver 7. The thread motor 6 moves the entire optical pickup 20 when relatively large movement of the beam spot S on the disc surface, such as relatively large track jump (a rough seek) or the like, is needed.

A signal detected by the photodetector 23 in the optical pickup 20 is supplied to an RF signal processing circuit 8. During recording and reproducing operations, the RF signal processing circuit 8 generates a focus error signal, a tracking error signal, a tilt error signal, and a wobble signal based on the signal supplied from the photodetector 23. During the reproducing operation, a reproduction signal corresponding to the pit train formed on the recording layer Db is further generated.

The focus error signal, the tracking error signal, the tilt error signal generated by the RF signal processing circuit 8 are fed to a focus control circuit 9, a tracking control circuit 10, and a tilt control circuit 11, respectively. The focus control circuit 9 controls a focus actuator (not illustrated) through a focus driver 12 based on the focus error signal, the tracking control circuit 10 controls a tacking actuator 24 through the tracking driver 5 based on the tracking error signal, and the tilt control circuit 11 controls a tilt actuator (not illustrated) through a tilt driver 13 based on the tilt error signal. In this manner, there are formed a focus servo loop for maintaining laser light in a state focused on the recording layer Db of the optical disc D, a tracking servo loop for causing the beam spot S to follow a track, and a tilt servo loop for holding the optical axis of laser light in a position perpendicular to the disc surface.

The wobble signal generated by the RF signal processing circuit 8 is supplied to a system control circuit 14 in which identification of an address is enabled by the wobble signal. Here, it should be noted that the system control circuit 14 is a CPU or the like which controls the overall optical disc recording and reproducing apparatus 100 according to a command signal from a host device 18.

During reproduction, a reproduction signal produced in the RF signal processing circuit 8 is supplied to a digital signal processing circuit 15 in which the reproduction signal supplied is processed through predetermined signal conditioning (for example, demodulation and error correction) to produce reproduction data and control data. The reproduction data produced by the digital signal processing circuit 15 is temporarily stored in a memory 16, such as a RAM, and then output via an interface 17 to the host device 18, such as a computer or the like. On the other hand, the control data produced by the digital signal processing circuit 15 is supplied to the system control circuit 14.

Upon receipt of recording data from the host device 18 during recording, the digital signal processing circuit 15 temporarily stores the recording data in the memory 16 to process the recording data through predetermined conditioning (for example, modulation and error-correction coding) for generation of a write signal. The write signal is supplied to the laser driver 4 which actuates the laser diode 22 according to the write signal. Through the actuation of the laser diode 22, a pit train corresponding to the recording data is formed on the recording layer Db, with a result that the recording data is recorded on the optical disc D.

Figure 5:
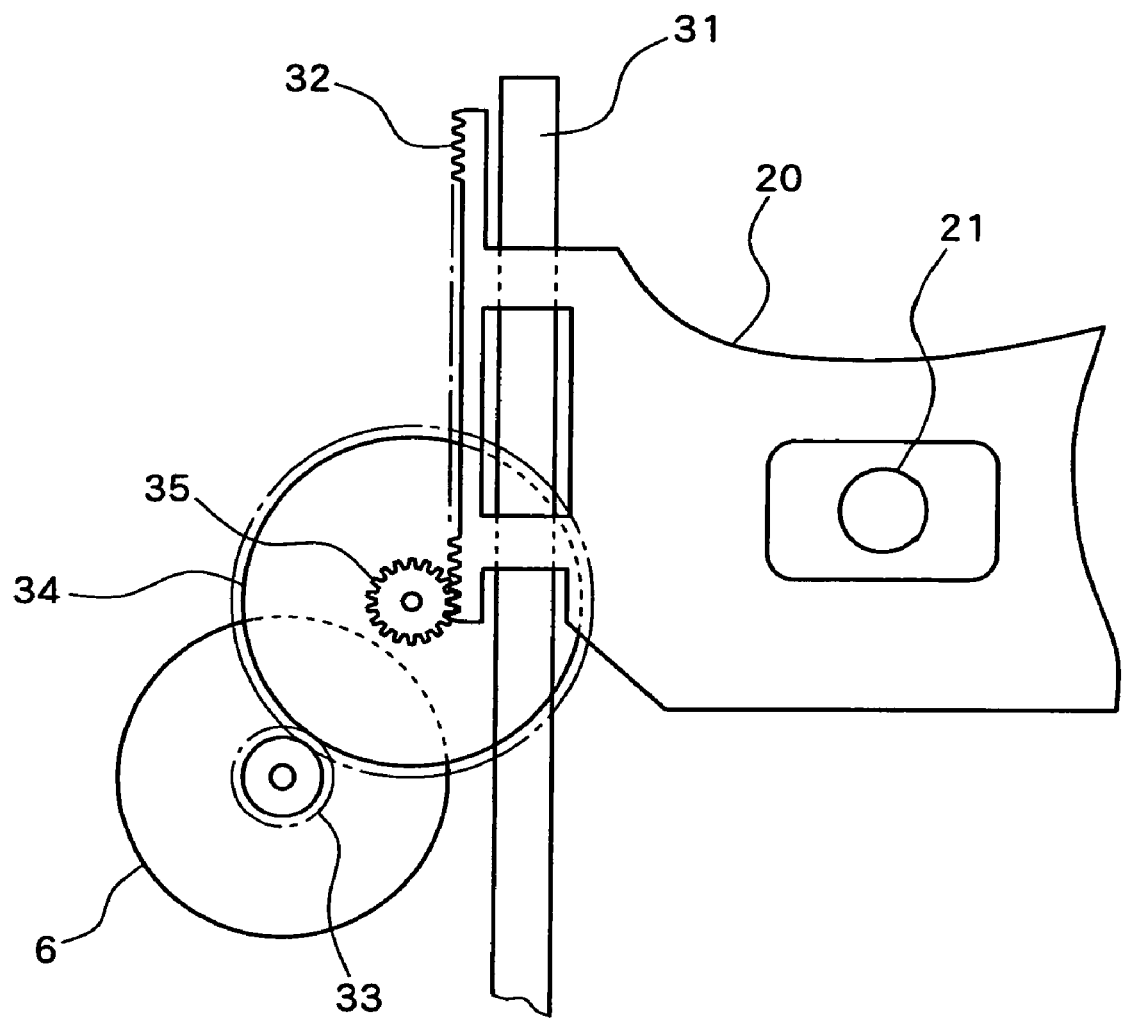
FIG. 5 shows an example of a structure of a pickup advance mechanism.

Next, an example of a mechanism to move the entire optical pickup 20 (hereinafter referred to as a pickup advance mechanism) will be described with reference to FIG. 5 in which a structure of the pickup advance mechanism is depicted as an example. In FIG. 5, the optical pickup 20 is movably supported by a guide shaft 31 and provided with a rack 32 mounted, on a side of the optical pickup 20 (on the left side in the figure), in parallel with the guide shaft 31. Driving torque of the thread motor 6 (a brush motor in this example) is transmitted from a drive gear 33 attached to the thread motor 6 via a reduction gear 34 engaging with the drive gear 33 to a pinion 35 which is coaxially integrated with the reduction gear 34. The drive torque transmitted as described above is converted into a thrust force generating rectilinear motion through the engagement of the pinion 35 and the rack 32. The optical pickup 20 is displaced along the guide shaft 31 by the thrust force.

In such a pickup advance mechanism, by increasing the ratio of speed reduction through the reduction gear 34, a travel stroke (a unit amount of traveling) of the optical pickup 20 can be shortened, which facilitates smooth movement of the optical pickup 20, yet reduces the speed of travel of the optical pickup 20. On the other hand, by minimizing the ratio of speed reduction through the reduction gear 34, the speed of travel can be increased, whereas the travel stroke is lengthened, thereby expanding torque load of the thread motor 6. Taking into account the speed of travel and the torque load, it is preferred that the travel stroke be set to approximately 80 µm. With this stroke, the accuracy with which the pickup advance mechanism moves the beam spot S, i.e. allowable differences between an actual travel distance and a target travel distance of the beam spot S, will be approximately ±40 µm.

Next, characteristic features according to this embodiment will be described in detail.

Although a red laser with a wavelength of 650 nm is conventionally used as recording and reproducing laser for a DVD-R or the like, a blue laser with wavelengths of 400-410nm is employed in this embodiment. Accordingly, the laser diode 22 shown in FIG. 4 is a blue laser diode emitting a blue laser light with wavelengths of 400-410 nm.

Through the shortening of laser wavelength, the diameter of the beam spot S (hereinafter referred to as "spot size") formed on the recording layer Db can be minimized. A typical spot size formed on DVD-Rs is approximately 0.9 µm, whereas the spot size is set to approximately 0.6 µm in this embodiment. Such a reduced spot size contributes to decrease of the track pitch TP. Accordingly, the track pitch TP of a DVD-R is typically approximately 0.74 µm, whereas the track pitch TP of this embodiment is established within a range of from 0.3 to 0.4 µm.

Referring now to FIG. 3, a recording format according to this embodiment will be described below. In the following description, the term "width" denotes a width along the radius direction of the optical disc D.

Because a data recording unit on one track is 64 Kbytes in this embodiment, the control data area for reproduction A2 must contain approximately 50 to 125 tracks to record user data control information. Therefore, in this embodiment, the number of tracks in the control data area for reproduction A2 is specified within a range of from 50 to 125. In other words, the width of the control data area for reproduction A2 along the radius direction of the optical disc D is defined within a range of from a value of TP multiplied by 50 to a value of TP multiplied by 125. Accordingly, the width of the control data area for reproduction A2 takes on values from 15µm to 50 µm. To allow for sufficient space in the control data area for reproduction A2, the width of the control data area for reproduction A2 may preferably be defined within a range of from a value of (50×TP) to a value of (150×TP).

It is preferable in terms of preventing the optical pickup 20 from overrunning that the inner guard zone A1 and the outer guard zone A4 be configured to contain approximately 100 to 125 tracks, which is preferable also in terms of facilitating smooth reading at each leading edge of the control data areas for reproduction A2 formed outside the zones A1 and A4. According to experimental data, the accuracy with which the optical pickup 20 remains within the zone in a seeking operation (seek error rate) represents that the above-described number of tracks will prevent, with a 99.9% or greater probability, the optical pickup 20 from entering into an unrecorded area. As a consequence, the number of tracks constituting the inner guard zone A1 and the outer guard zone A4 is specified within a range of values from 100 to 125. In other words, the width of the inner and outer guard zones A1 and A4 along the radius direction of the optical disc D is defined within a range of from a value of (100×TP) to a value of (125×TP). Accordingly, the width of the inner and outer guard zones A1 and A4 takes on values of 30-50 µm. It is preferable in terms of securing overrun protection that the width of the inner or outer guard zone A1 or A4 be specified within a range of from a value of (100×TP) to a value of (150×TP).

The width of the user data area A3 is determined based on the precision of a track jump position in the reproduction system, i.e. determined based on allowable difference between an actually accessed position and a target access position after track jump. To facilitate access to a desired track, the user data area A3 must have a width covering at least a dimension corresponding to the precision of track jump position. Further, in consideration of an error of the track pitch TP and backlash of the gears, a width approximately 2 to 2.5 times as wide as the above-described width is needed for ensuring stability of track access.

The precision of track jump position can be expressed as ±(A+B+C), where ±A is the accuracy with which the pickup advance mechanism moves the beam spot S, B is the amount of decentering of the disc, and C is an error of chucking of the optical disc D. In this embodiment, the width of the user data area A3 is set, regardless of the amount of user data to be recorded, to a width equal to or greater than the minimum recording width which is specified within a range of values from {(A+B+C)×2} to {(A+B+C)×2×2.5}.

More specifically, the minimum recording width is determined within a range of from 420 μm to 1050 μm calculated by letting A=40 μm, B=70 μm, and C=100 μm, which are selected as adequately attainable values with present technology. It is also preferable in terms of improvement in recording efficiency that the minimum recording width be defined within a range of from a value of {(A+B+C)×2} to a value of {(A+B+C)×2×2}, and more specifically, a range of from 420 μm to 840 μm.

The widths of the control data area for reproduction A2 and the inner and outer guard zones A1 and A4, and the minimum recording width of the user data area A3 are also defined according to the above-described definition scheme, for example, as indicated in the following example of setting values. In this example, the track pitch TP is set to 0.4 μm, the number of tracks constituting the control data area for reproduction A2 and the inner and outer guard zones A1 and A4 is set to 125. In other words, the control data area for reproduction A2 and the inner and outer guard zones A1 and A4 have the width of 50 μm. In addition, the minimum recording width is set to 1000 μm. Here, it would be understood by a person skilled in the art that tolerance would be given to the above-described setting values when the setting values are used as specifications for optical discs. FIG. 3 shows numeric values indicated in the above-described example of setting values. In FIG. 3, the width of the user data area A3 is equal to the minimum recording width.

Figure 6:
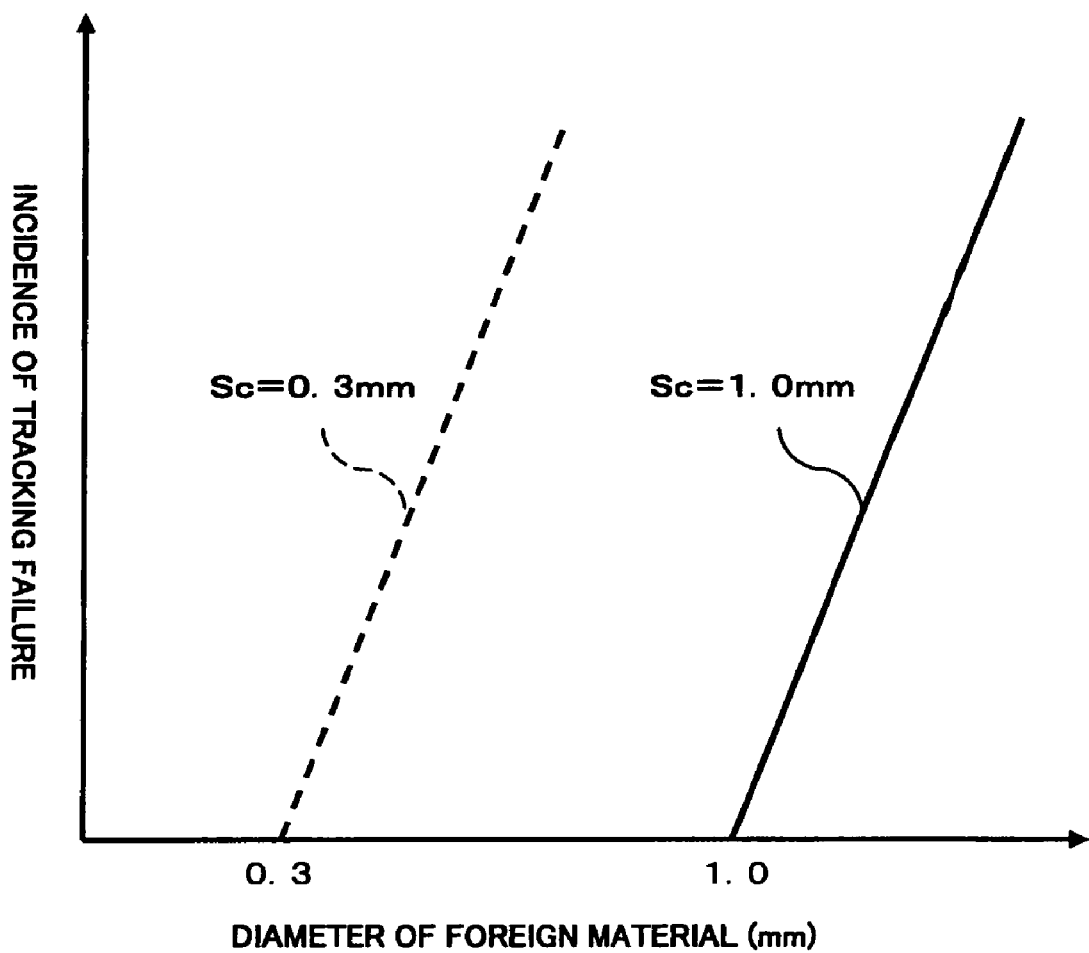
FIG. 6 shows a relationship between the diameter of a foreign material and incidence of tracking failure.
Figure 7:
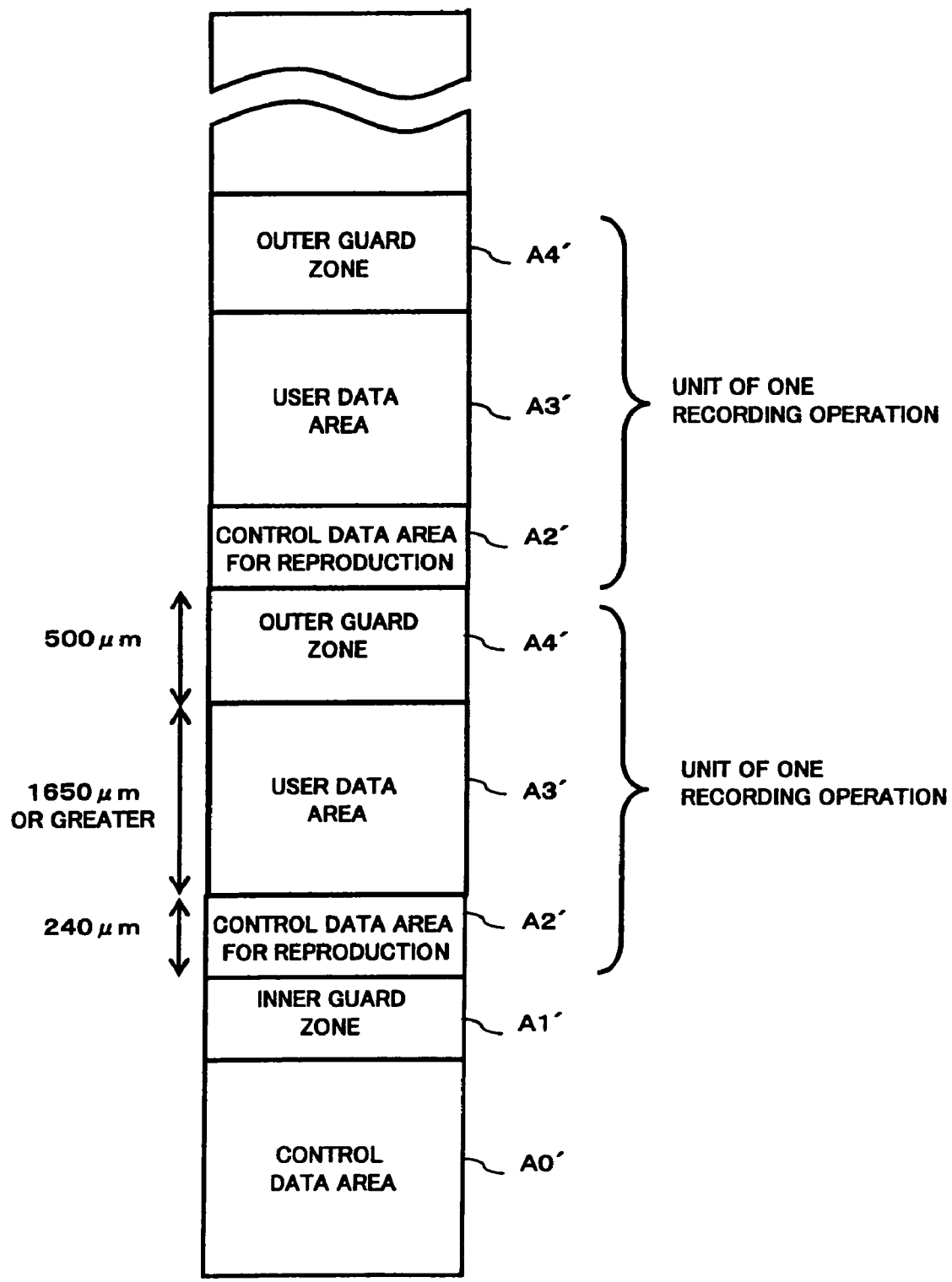
FIG. 7 shows a data layout in a DVD-R.

During reproduction, the occurrence of foreign material, such as dust or dirt, on the protective layer Dc of the optical disc D can cause a phenomenon in which the beam spot S deviates from the track which should be traced by the beam spot S (tracking failure). The likelihood of causing the tracking failure increases as the diameter of the reproduction beam spot Sc at the surface of the protective layer Dc (refer to FIG. 1) becomes smaller. FIG. 6 shows the relationship between the size (diameter) of the foreign material and the incidence of tracking failure. In FIG. 6, the solid line depicts the relationship in a case where the diameter of the reproduction beam spot Sc is 1 mm, and the broken line depicts a case where the diameter of the reproduction beam spot Sc is 0.3 mm. As is evident from FIG. 6, when the diameter of the foreign material is equal to or smaller than the diameter of the reproduction beam spot Sc, the foreign material causes almost no tracking failure. However, the incidence of tracking failure sharply increases as the diameter of the foreign material grows beyond the diameter of the reproduction beam spot Sc. Although, in general, a cartridge to house the optical disc D is unnecessary as long as data can be reproduced in the event of the occurrence of a foreign material having a diameter of approximately 1 mm adhering to the optical disc D, the necessity of using the cartridge arises when data cannot be reproduced in the above-described event. To eliminate the necessity of using the cartridge, the diameter of the reproduction beam spot Sc at the surface of the protective layer Dc is set to approximately 1 mm in this embodiment. It should be noted that the thickness of the protective layer Dc shown in FIG. 1 is approximately 0.6 mm.

Because the track pitch TP of the optical disc D is defined within the range of from 0.3 μm to 0.4 μm, and the width of the outer guard zone A4 is defined to be smaller than or equal to the value of (125×TP) in the above-described embodiment, the width of the outer guard zone A4 according to the embodiment becomes narrower than that of typical DVD-R or the like. To be more specific, the width of the outer guard zone A4 in a conventional DVD-R is 500 μm, while the width according to this embodiment is 50 μm or smaller. Thus, a proportion of the outer guard zone A4 in the total recordable area of the optical disc D can be minimized according to this embodiment, thereby enabling reduction in proportion of data, such as padding data or the like, which is regarded as useless data by users. In this manner, user data can be recorded on the optical disc D with a higher degree of efficiency, which brings about an improvement in spatial and temporal efficiencies of recording. On the other hand, because the width of the outer guard zone A4 is determined to be greater than or equal to the value of (100×TP), the number of tracks required for preventing overrun or the like can be secured, to thereby ensure playability of the play-only apparatus. As such, according to the embodiment of the present invention, it is possible to pursue an improvement in spatial and temporal efficiencies of recording while ensuring playability of the play-only apparatus.

Similarly, because the track pitch TP of the optical disc D is defined within the range of from 0.3 μm to 0.4 μm, and the width of the control data area for reproduction A2 is defined to be smaller than or equal to a value of (125×TP), the width of the control data area for reproduction A2 becomes narrower compared with conventional DVD-R or the like. To be more specific, the width of the control data area for reproduction A2 in a conventional DVD-R is 240 μm, while the width in this embodiment is 50 μm or smaller. Thus, a proportion of the control data area for reproduction A2 in the total recordable area of the optical disc D can be minimized according to this embodiment, thereby enabling reduction in proportion of control information which is not directly needed by the users. As a result of such reduction, user data can be recorded on the optical disc D with a higher degree of efficiency, which brings about an improvement in spatial and temporal efficiencies of recording. On the other hand, because the width of the control data area for reproduction A2 is determined to be greater than or equal to a value of (50×TP), the number of tracks required for recording user data control information can be secured, to thereby ensure playability of the play-only apparatus.

Further, because the track pitch TP of the optical disc D is defined within the range of from 0.3 μm to 0.4 μm, and the width of the inner guard zone A1 is defined within the range of from a value of (100×TP) to a value of (125×TP), similarly to the outer guard zone A4, the spatial or temporal efficiency of recording can be improved while ensuring playability of the play-only apparatus.

Still further, because the minimum recording width of the user data area A3 is set to 1050 μm or smaller, the minimum recording width becomes narrower compared with a typical DVD-R having the minimum recording width of 1650 μm.

Thus, a proportion of the minimum recording width in the total recordable area of the optical disc D can be minimized according to this embodiment, thereby enabling reduction in proportion of data, such as padding data or the like, regarded as useless data by users. In this manner, user data can be recorded on the optical disc D with a higher degree of efficiency, which brings about an improvement in spatial and temporal efficiencies of recording. On the other hand, because the minimum recording width is set to 420 μm or greater, the recording width necessary for smooth access to the tracks in a play-only apparatus can be secured, to thereby preferably ensure playability of the play-only apparatus.

Further, because the diameter of the reproduction beam spot Sc at the surface of the protective layer Dc is set to approximately 1 mm, reproduction can be performed even in the event of the occurrence of foreign material having a diameter of 1 mm adhering to the optical disc D. In this manner, it becomes unnecessary to use the cartridge to house the optical disc D.

Although the present invention has been described in accordance with the preferred embodiment, it is understood that the invention is not limited to the above-described specific embodiment. For example, the structure of the optical disc recording and reproducing apparatus 100 may be changed as appropriate. Further, although the optical disc recording and reproducing apparatus 100 is described in the above embodiment, recording and reproducing of data may be performed by a physically separate recording apparatus and a reproduction apparatus.

Although it is preferred that all the following conditions: (a) the width of the outer guard zone is greater than or equal to a value of (100×TP) and smaller than or equal to a value of (125×TP); (b) the width of the control data area for reproduction is greater than or equal to a value of (50×TP) and smaller than or equal to a value of (125×TP); (c) the width of the inner guard zone is greater than or equal to a value of (100×TP) and smaller than or equal to a value of (125×TP); (d) the minimum recording width in the user data area is greater than or equal to 420 μm and smaller than or equal to 1050 μm; and (e) the diameter of the reproduction beam spot at the surface of the protective layer is approximately 1 mm, be satisfied, it is also preferable that one to four conditions appropriately selected from the above conditions be satisfied.

What is claimed is:

1. An optical disc recording method in which data is recorded on an optical disc using a combination of a user data area where user data is recorded, a control data area for reproduction allocated on an inner radius side of said user data area, and an outer guard zone allocated on an outer radius side of said user data area as a unit of one recording operation, wherein:
    a track pitch TP of said optical disc is greater than or equal to 0.3 μm and smaller than or equal to 0.4 μm,
    the width of said outer guard zone along a radius direction of said optical disc is greater than or equal to a value of (100×TP) and smaller than or equal to a value of (125×TP),
    the width of said user data area along the radius direction of said optical disc is determined to be greater than or equal to a predetermined minimum recording width regardless of the amount of user data to be recorded, and
    said minimum recording width is specified within a range of value from {(A+B+C)×2} to {(A+B+C)×2×2.5}, where A denotes an accuracy with which a pickup advance mechanism moves a beam spot, B denotes an amount of decentering of the disc, and C denotes an error of chucking of the optical disc.

2. The optical disc recording method according to claim 1, wherein:
    the width of said control data area for reproduction along the radius direction of said optical disc is greater than or equal to a value of (50×TP) and smaller than or equal to a value of (125×TP).

3. The optical disc recording method according to claim 1, wherein:
    an inner guard zone is formed on an inner radius side of the unit of one recording operation recorded on an innermost circumference, and
    the width of said inner guard zone along the radius direction of said optical disc is greater than or equal to a value of (125×TP).

4. The optical disc recording method according to claim 1 wherein:
    said minimum recording with is greater than or equal to 420 μm and smaller than or equal to 1050 μm.

5. The optical disc recording method according to claim 2, wherein:
    an inner guard zone is formed on an inner radius side of the unit of one recording operation recorded on an innermost circumference, and
    the width of said inner guard zone along the radius direction of said optical disc is greater than or equal to a value of (100×TP) and smaller than or equal to a value of (125×TP);
    said minimum recording width is greater than or equal to 420 μm and smaller than or equal to 1050 μm.

6. An optical disc recording and reproducing method including the optical disc recording method according to claim 1 wherein:
    said optical disc has a protective layer laminated on a surface of a recording layer where data is recorded, and
    a diameter of a reproduction beam spot at a surface of said protective layer is approximately 1 mm.

7. An optical disc recording and reproducing method including the optical disc recording method according to claim 5, wherein:
    said optical disc has a protective layer laminated on a surface of a recording layer where data is recorded, and
    a diameter of a reproduction beam spot at a surface of said protective layer is approximately 1 mm.

8. An optical disc recording apparatus in which data is recorded on an optical disc using a combination of a user data area where user data is recorded, a control data area for reproduction allocated on an inner radius side of said user data area, and an outer guard zone allocated on an outer radius side of said user data area as a unit of one recording operation, wherein:
    a track pitch TP of said optical disc is greater than or equal to 0.3 μm and smaller than or equal to 0.4 μm,
    the width of said outer guard zone along a radius direction of said optical disc is greater than or equal to a value of (100×TP) and smaller than or equal to a value of (125×TP),
    the width of said user data area along the radius direction of said optical disc is determined to be greater than or equal to a predetermined minimum recording width regardless of the amount of user data to be recorded, and
    said minimum recording width is specified within a range of value from {(A+B+C)×2} to {(A+B+C)×2×2.5}, where A denotes an accuracy with which a pickup advance mechanism moves a beam spot, B denotes an amount of decentering of the disc, and C denotes an error of chucking of the optical disc.

9. The optical disc recording apparatus according to claim 8, wherein:
the width of said control data area for reproduction along the radius direction of said optical disc is greater than or equal to a value of (50×TP) and smaller than or equal to a value of (125×TP).

10. The optical disc recording apparatus according to claim 8, wherein:
an inner guard zone is formed on an inner radius side of the unit of one recording operation recorded on an innermost circumference, and
the width of said inner guard zone along the radius direction of said optical disc is greater than or equal to a value of (100×TP) and smaller than or equal, to a value of (125×TP).

11. The optical disc recording apparatus according to claim 8, wherein:
said minimum recording width is greater than or equal to 420 μm and smaller than or equal to 1050 μm.

12. The optical disc recording apparatus according to claim 9, wherein:
an inner guard zone is formed on an inner radius side of the unit of one recording operation recorded on an innermost circumference,
the width of said inner guard zone along the radius direction of said optical disc is greater than or equal to a value of (100×TP) and smaller than or equal to a value of (125×TP); and
said minimum recording width is greater than or equal to 420 μm and smaller than or equal to 1050 μm.

13. An optical disc recording and reproducing apparatus including the optical disc recording apparatus according to claim 8, wherein:
said optical disc has a protective layer laminated on a surface of a recording layer where data is recorded, and
a diameter of a reproduction beam spot at a surface of said protective layer is approximately 1 mm.

14. An optical disc recording and reproducing apparatus including the optical disc recording apparatus according to claim 12, wherein:
said optical disc has a protective layer laminated on a surface of a recording layer where data is recorded, and
a diameter of a reproduction beam spot at a surface of said protective layer is approximately 1 mm.

* * * * *

UNITED STATES PATENT AND TRADEMARK OFFICE
CERTIFICATE OF CORRECTION

PATENT NO. : 7,492,697 B2
APPLICATION NO. : 11/141833
DATED : February 17, 2009
INVENTOR(S) : Tsuyoshi Yamamoto et al.

It is certified that error appears in the above-identified patent and that said Letters Patent is hereby corrected as shown below:

On title page, item 73 Assignees
add "Kabushiki Kaisha Toshiba, Tokyo (JP)"
as an Assignee.

Signed and Sealed this

Twenty-sixth Day of January, 2010

David J. Kappos
*Director of the United States Patent and Trademark Office*